(No Model.)
C. E. SCRIBNER.
DYNAMO ELECTRIC MACHINE.
No. 522,274. Patented July 3, 1894.
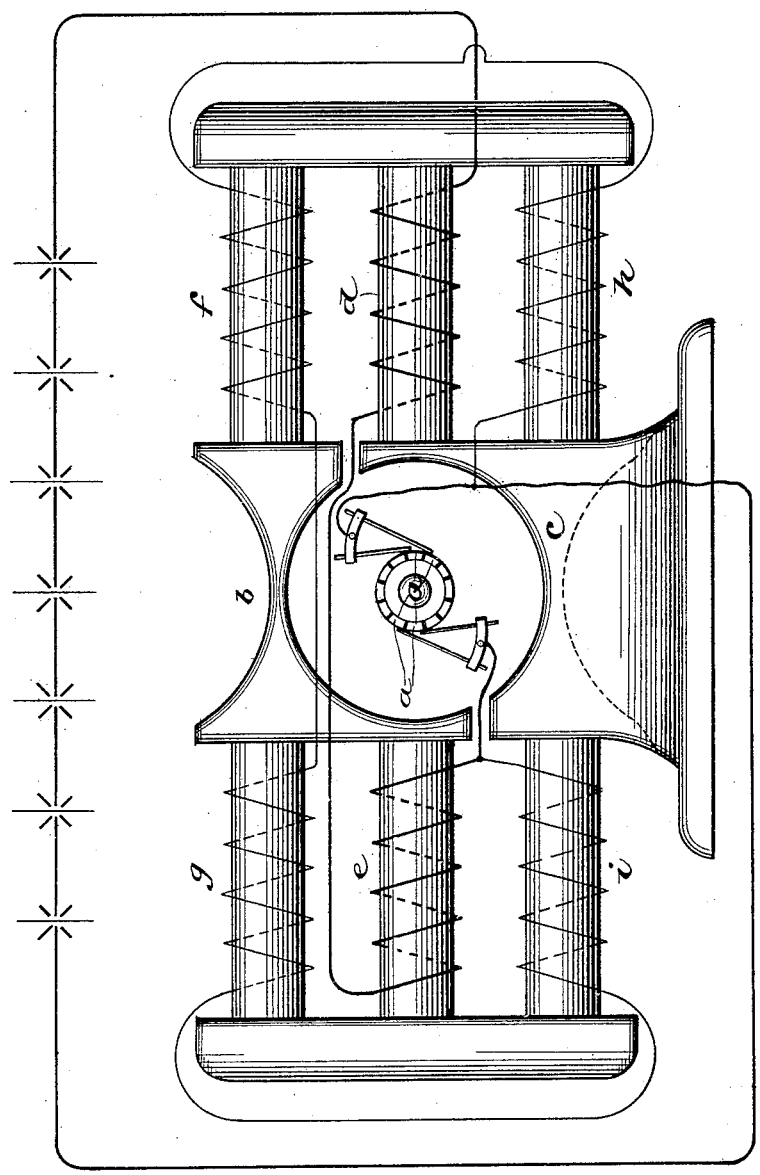
Witnesses.
C. G. Hawley.
G. R. Parker
Inventor.
Charles E. Scribner
By George P. Barton
Attorney.

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

DYNAMO-ELECTRIC MACHINE.

SPECIFICATION forming part of Letters Patent No. 522,274, dated July 3, 1894.

Application filed June 1 1889. Renewed December 7, 1893. Serial No. 492,987. (No model.)

*To all whom it may concern:*

Be it known that I, CHARLES E. SCRIBNER, a citizen of the United States, residing at Chicago, in the county of Cook and State of Illinois, have invented a certain new and useful Improvement in Dynamo-Electric Machines, (Case No. 203,) of which the following is a full, clear, concise, and exact description, reference being had to the accompanying drawing, forming a part of this specification.

My invention relates to the manufacture of dynamo electric machines, and its object is to provide for automatically controlling the current strength notwithstanding variations in the work which is being done, and at the same time to prevent objectionable sparking at the collecting commutator.

I have heretofore discovered a method of preventing sparking at the commutator which I have illlustrated and described in my application, Serial No. 312,921, (Case No. 196,) the essential feature of said method consisting in maintaining a practically constant field of force for the short circuited coils of the armature of such strength that the current built up in the short circuited coils will at the moment they are introduced into the circuit of the current producing coils be equal to the current in the circuit of said current producing coils.

My invention herein contemplates preventing sparking by essentially the same method, the construction of the apparatus, however, and the manner of maintaining the current strength being essentially different.

My invention consists more especially in the construction of the field of force magnets and the disposition of the poles thereof about the armature, these pole pieces having their cores so wound and connected that the short circuited coils will have a field of force of the required strength maintained practically constant, while the field of force of the current giving coils will be automatically varied in intensity to vary the electro motive force of the machine to maintain practically a constant current notwithstanding variations in the resistance of the working circuit.

My invention will be more readily understood by reference to the accompanying drawing, in which I have shown a dynamo electric machine embodying my invention in connection with an arc light circuit supplied with current therefrom. The coils connected with the commutator segments $a$ are the short circuited coils. The poles $b\ c$ are excited by current in the coils $d\ e, f\ g$ and $h\ i$. It will be observed that the coils $d\ e$ are directly included in the main circuit and that the coils $f\ g, h\ i$ are included in a shunt around the lamps or other translating devices. Now it is the current through the coils $d\ e$ which more especially causes the field of force of the short circuited coils, while it is the current through the coils $f\ g, h\ i$ which causes the field for the current producing coils. The coils $d\ e$ being in the main circuit their current will be practically constant, and, therefore, their immediate poles, that is to say, the portions of the pole pieces directly opposite the brushes will have a practically uniform excitation, thus causing a practically constant field for the short circuited coils, the winding of the machine being such that this field will be sufficient to cause proper current to be built up in said short circuited coils to avoid sparking. The portion of the poles $b\ c$ between the cores of coils $f\ g$ and $h\ i$ will be excited by the current directed through the shunt around the work. The current in this shunt circuit, that is, in the coils $f\ g, h\ i$ will vary as the work varies, increasing as the work is increased, and diminishing as the work diminishes. Thus the field of force of the current giving coils will be increased in intensity by an increase in the load, thus correspondingly increasing the electro motive force of the machine so as to maintain a practically uniform current strength. It will be observed that the pole pieces $b\ c$ have each extending therefrom cores, each pole piece having one core on one side thereof and two on the other side. The particular number of ampère turns, the size of the wire and the shape of the pole pieces it is evident might be varied according to circumstances.

A machine of a given character being required the winding of the coils which cause the field for the short circuited coils may be readily determined, as well as the winding of the coils which are included in the fine wire shunt around the work.

By apparatus consisting of rheostats similar to those shown in my said Case, No. 196, it is evident that the strength of current in the different field coils may be varied at will as circumstances may require.

I am aware that prior to my invention pole pieces had been provided with several projecting cores; such cores have sometimes been arranged radially about the pole piece and cast in a single piece therewith, but in none of these prior devices has provision been made for varying the strength of one portion of the pole with respect to another portion thereof, or of maintaining one portion of the pole at a practically uniform degree of excitation while the other portion of the same pole is varied as to its intensity of excitation.

Each of the two pole pieces, as shown in the drawing, is provided with three cores, these cores being distributed about the pole pieces in the direction of the rotation of the armature to produce in the pole pieces lines of force of a constant strength and number at certain portions of the pole pieces, while at the other portions of the same pole pieces the lines of force may be of a different strength and number. I thus have between the cores $h$ and $i$ a consequent pole, and a consequent pole is also between the cores $f$ and $g$. The extended portion of the pole $c$ at the end of the core $d$ is maintained at practically constant magnetization, as is also the extension of the pole $b$ opposite the core $d$. Starting with the core $d$ of the pole $b$, I shall find that the other cores thereof, $g$ and $e$, follow in the direction of the rotation of the armature, and starting with the core $i$ of pole $c$ I find that the other cores $h$ and $d$ follow also in the same order and direction, these cores being preferably as shown in a plane at right angles to the axis of rotation of the armature. It is evident that the number of cores and their arrangement may be varied in different machines, and that their windings may be adjusted in various ways to produce the result desired. I do not limit myself, therefore, to the details of construction shown, but claim broadly the method and apparatus herein set forth.

Having thus described my invention, I claim as new and desire to secure by Letters Patent—

1. The two pole pieces of a dynamo electric machine, each provided with two cores, each pole piece being on opposite sides thereof, and the coils thereof being included in a shunt around the translating devices which are being supplied with current from the machine, in combination with a third core for each pole piece connected with a projecting portion of each pole piece, said extra or auxiliary pole pieces being on opposite sides of the armature and in the same plane, and with the other cores in a plane at right angles to the axis of the rotation of the armature, said extra pole pieces being provided with coils included in the main circuit, substantially as and for the purpose specified.

2. The combination with the armature of the dynamo, of two or more field cores provided with field coils in shunt of the working circuit, and two field cores provided with field coils in series in the main circuit, said cores being distributed symmetrically about the armature, and the two pole pieces each nearly encircling half the armature, and connected with one-half of the shunt field and with one of the series fields, each pole piece being thin to nearly divide the same between the shunt field cores and the series field cores to maintain the fields therefrom practically separate, substantially as described.

3. The combination with an armature and the commutator thereof, of collecting brushes bearing upon the commutator adapted to short-circuit each armature coil for a portion of its revolution before it is included into circuit with the coils in advance of the brushes, field magnets of constant strength in position to induce electro-motive force in each of the short-circuited coils, other field magnets of variable strength in position to induce electro-motive forces in the active coils of the armature, a constant and a variable field magnet terminating in a pole piece upon each side of the armature, the strength of the variable field magnets being adjusted to induce the proper current in the armature, as specified.

4. The combination with an armature and the commutator thereof, of collecting brushes bearing upon the commutator adapted to short-circuit each armature coil for a portion of its revolution before it is introduced into circuit with the coils in advance of the brushes, a field magnet of constant strength in position to create electro-motive force in each short-circuited coil, a field magnet of strength varying in response to changes of main circuit resistance in position to create electro-motive forces in each set of active coils, a constant field magnet and a variable field magnet terminating in a pole piece whose magnetic resistance is increased on a line between the two magnets, substantially as described.

5. In a constant current dynamo, the combination with an armature and the commutator thereof, of collecting brushes bearing upon the commutator adapted to short-circuit each armature coil before it is brought into circuit with the active coils in advance of the brushes, a field magnet in the main circuit of the machine in position to create electro-motive force in each short-circuited coil, another field magnet in shunt of the main circuit in position to create electro-motive forces in each set of active coils, a constant and a variable field magnet terminating in a single pole piece presented to the armature, said pole piece being increased in magnetic resistance on a line between the two magnets, substantially as described.

In witness whereof I hereunto subscribe my name this 16th day of May, A. D. 1889.

CHARLES E. SCRIBNER.

Witnesses:
 ELLA EDLER,
 GEORGE P. BARTON.